(12) United States Patent  
Zajac, III

(10) Patent No.: US 9,292,957 B2
(45) Date of Patent: *Mar. 22, 2016

(54) PORTABLE VIRTUAL CHARACTERS

(71) Applicant: Disney Enterprises, Inc., Burbank, CA (US)

(72) Inventor: William Valentine Zajac, III, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,066

(22) Filed: Mar. 16, 2015

(65) Prior Publication Data

US 2015/0193960 A1 Jul. 9, 2015

Related U.S. Application Data

(63) Continuation of application No. 13/362,929, filed on Jan. 31, 2012, now Pat. No. 8,982,133.

(51) Int. Cl.
*G06T 13/80* (2011.01)
*A63F 13/40* (2014.01)
*A63F 13/30* (2014.01)
*G06F 3/14* (2006.01)

(52) U.S. Cl.
CPC .................. *G06T 13/80* (2013.01); *A63F 13/10* (2013.01); *A63F 13/12* (2013.01); *G06F 3/1446* (2013.01); *A63F 2300/204* (2013.01); *A63F 2300/552* (2013.01); *A63F 2300/554* (2013.01)

(58) Field of Classification Search
None
See application file for complete search history.

(56) References Cited

U.S. PATENT DOCUMENTS

2011/0159813 A1* 6/2011 Mallinson et al. ........... 455/41.2
2012/0249443 A1* 10/2012 Anderson et al. ............. 345/173
2013/0290876 A1* 10/2013 Anderson et al. ............. 715/761

* cited by examiner

*Primary Examiner* — Mark Zimmerman
*Assistant Examiner* — Vu Nguyen
(74) *Attorney, Agent, or Firm* — Ference & Associates LLC

(57) ABSTRACT

Described herein are methods, systems, apparatuses and products for portable virtual characters such as virtual characters. One embodiment provides a method for providing a virtual character, including: storing, in device memory, a listing of at least one mobile device having at least one device component selected from the group consisting of an accelerometer, a camera, and a microphone; and transferring, using a processor, to a mobile device information to permit an instantiation of a mobile device version of a virtual character on the mobile device, the instantiation of the virtual character on the mobile device including at least one virtual character attribute matching the at least one device component selected from the group consisting of an accelerometer, a camera, and a microphone. Other embodiments are disclosed and claimed.

20 Claims, 12 Drawing Sheets

PORTABLE VIRTUAL CHARACTERS

CROSS REFERENCE TO RELATED APPLICATIONS

This application is a continuation of U.S. patent application Ser. No. 13/362,929, entitled "Portable Virtual Characters," and filed on Jan. 31, 2012, the contents of which are incorporated by reference herein.

FIELD

The subject matter described herein generally relates to virtual characters, such as virtual pets.

BACKGROUND

Portable electronic pets, such as the TAMAGOTCHI digital pets, are known. A TAMAGOTCHI pet is a small electronic device that provides a pet simulation. TAMAGOTCHI pet characters are based on a variety of things, such as animals or people. TAMAGOTCHI pets are premised on the concept that the pets are an alien species placed on earth as an egg. A player raises the TAMAGOTCHI pet, which will mature differently depending on the player provided influences. The user interface consists of physical buttons and a display screen, and the pet may include other peripheral devices, such as a speaker. A variety of menus and options for interacting with the toy are provided. For example, a health menu that details the pet's health status (such as weight, hunger, et cetera) is provided. TAMAGOTCHI is a registered trademark of Kabushiki Kaisha Bandai Corporation in the United States and/or other countries.

Pets with an online presence are also known. For example, WEBKINZ pets, which are stuffed animals with online avatars, combine an online or virtual component with a physical toy. Each physical toy includes a printed secret code that provides access to an associated web site in which a virtual version of the pet is available for online play. WEBKINZ is a registered trademark of Ganz Corporation in the United States and/or other countries.

BRIEF SUMMARY

In summary, one aspect provides a method for providing a virtual character, comprising: storing, in device memory, a listing of at least one mobile device having at least one device component selected from the group consisting of an accelerometer, a camera, and a microphone; and transferring, using a processor, to a mobile device information to permit an instantiation of a mobile device version of a virtual character on the mobile device, the instantiation of the virtual character on the mobile device including at least one virtual character attribute matching the at least one device component selected from the group consisting of an accelerometer, a camera, and a microphone.

Another aspect provides a device, comprising: a network communication element; a memory; and one or more processors operatively coupled to the memory and the network communication element, the one or more processors executing instructions stored in the memory to: store in a device memory a listing of at least one mobile device having at least one device component selected from the group consisting of an accelerometer, a camera, and a microphone; and transfer to a mobile device information to permit an instantiation of a mobile device version of a virtual character on the mobile device, the instantiation of the virtual character on the mobile device including at least one virtual character attribute matching the at least one device component selected from the group consisting of an accelerometer, a camera, and a microphone.

A further aspect provides a computer program product for providing a virtual character, comprising: a computer readable storage device having computer readable program code embodied therewith, the computer readable program code being executable by a processor and comprising: code that stores in a device memory a listing of at least one mobile device having at least one device component selected from the group consisting of an accelerometer, a camera, and a microphone; and code that transfers to a mobile device information to permit an instantiation of a mobile device version of a virtual character on the mobile device, the instantiation of the virtual character on the mobile device including at least one virtual character attribute matching the at least one device component selected from the group consisting of an accelerometer, a camera, and a microphone.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
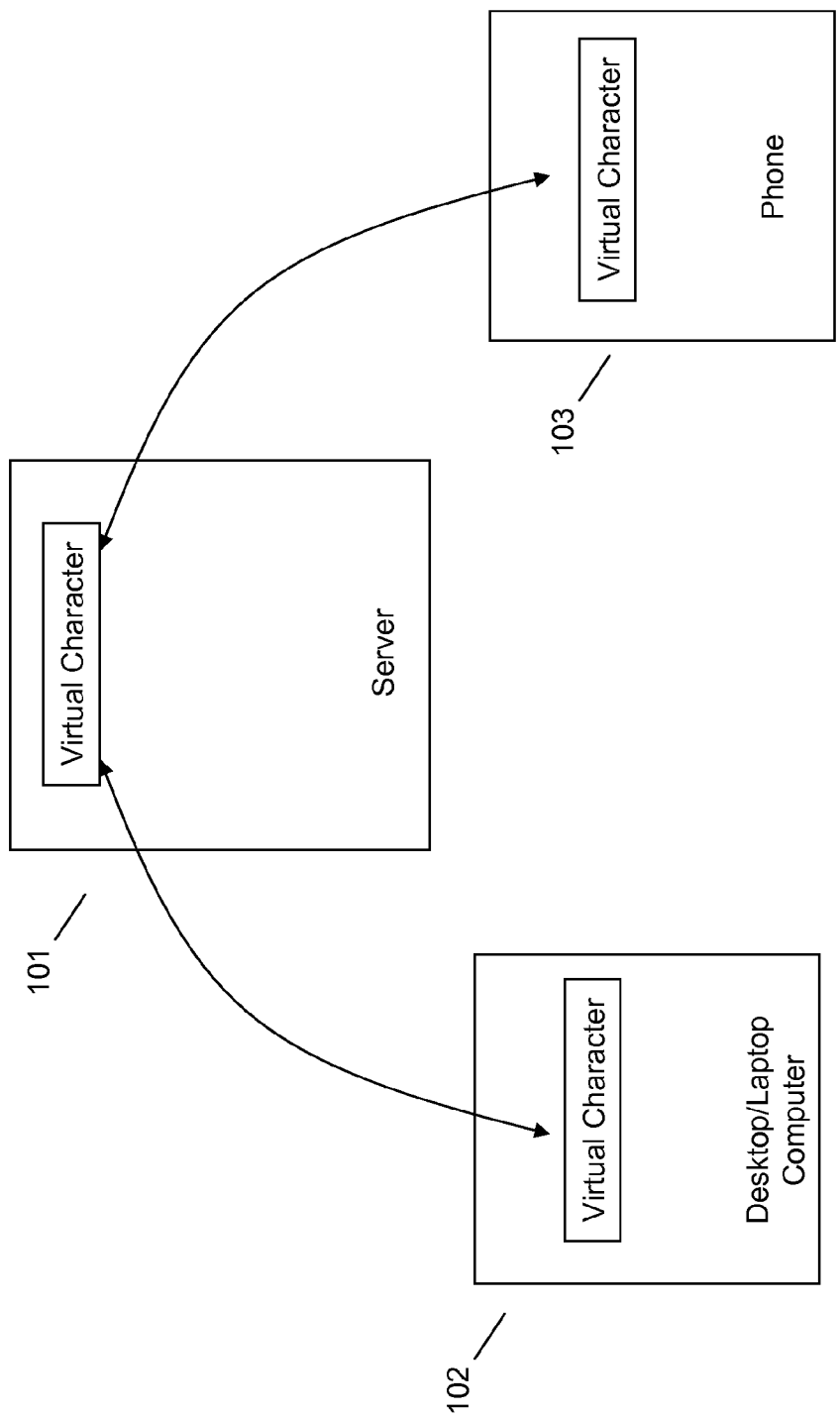
FIG. 1 illustrates an example operating environment for a portable virtual character.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of example embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

While digital/electronic toys that are portable are available, such as TAMAGOTCHI pet characters, and toys with an online presence are available, such as WEBKINZ toys, conventional toys do not provide a virtual character that is portable and adapted to different environments as experienced through different devices. Accordingly, an embodiment provides a portable virtual "character", such as a virtual "pet" (with the terms "character" and "pet" being defined herein to broadly include any virtual object (game object or character, toy, doll, ball, et cetera) that "lives" (exists in, is stored in one instance) in one environment (for example, online), but is portable to various other environments (for example, other devices of the user), and is influence by its experiences in these different environments hosted by the other devices. Throughout the description virtual characters are described, in some instances as a human like character, in other instances as a pet character, as non-limiting examples. Those having skill in the art will recognize, however, that other virtual character(s) may similarly be provided by various embodiments.

In an embodiment, a database, a state machine, and processes for interaction with a virtual character may mostly reside on a server, with a web front end as a primary interface. In this online environment a user may interact and play with an online instantiation of the virtual character. An embodiment may require or give special benefits to a character for "leaving" its online home and interacting with the "real" world, as represented by another device hosting another, "real" world environment. An embodiment may also allow for game play interactions with the device attributes as represented in device components, such as allowing virtual character interaction with peripheral devices such as an embedded camera, microphone, et cetera. Through these device attributes the virtual character may interact with the environment surrounding the device currently hosting the virtual character. An embodiment may thus make use of augmented reality and portable device capabilities to form a truly portable virtual character experience for a user.

The description now turns to the figures. The illustrated example embodiments will be best understood by reference to the figures. The description is intended only by way of example and simply illustrates certain example embodiments representative of the invention, as claimed.

Referring generally to FIG. 1, embodiments augment conventional online and digital character experiences with an ability to transfer a virtual character to new environments hosted by different devices. This allows for the virtual character to be portable. Moreover, the instantiation or version of the character, that is, the character's particular attributes, when on the different device may be influenced by the attributes of the different device. Thus, the virtual character is also adaptable to new environments.

For example, the virtual character version online, as for example hosted by a central server 101, may include a wide variety of attributes (ability to talk, hear, sense motion, sense temperature) that, when a version of the virtual character is transferred to an appropriate device, such as a mobile phone 103, are utilized to augment reality. As a simple, non-limiting example, if the virtual character is transferred to a device 103 with an accelerometer, the virtual character instantiation on that device 103 may note movement of the device via the accelerometer and respond accordingly. In contrast, a version of the virtual character on a non-mobile device 102 (lacking an accelerometer) may not include an attribute for utilizing accelerometer input.

A primary interface for the character on an information handling device such as desktop computer 102 may include a web browser interface. Thus, a screen, a keyboard, and a pointer such as a mouse or a touch screen may be included. For a mobile information handling device 103, a primary interface for the mobile device 103 may be a downloadable application. A benefit of an application is that it allows easier access to the hardware on the mobile device 103. However, using an application is more static and difficult to update, and may require multiple builds to match different device types.

The server 101 may consist of a web server fronting a state machine, in turn fronting a database. Various levels of caching for scalability and performance could exist at any level. Interaction logic and algorithms for most interactions may be maintained in an online server 101 for ease of updating. Like the data however, some logic for interactions may be hard coded into a mobile application so that it could gracefully handle the event of loss of connectivity.

Transferability of the virtual character (portability) is a central theme. While there are various mechanisms (push and pull) for transferring a virtual character between devices 101-103, the following are example mechanisms for transferring a virtual character.

An application on the device 103 (for example, a user's mobile phone) could use a peripheral device thereof (for example, a camera), to recognize a transfer indication or signal. Using a camera as an example, when pointed at a computer monitor of a device 102 hosting an online version of the virtual character, the camera input is utilized to recognize the character or other image. An application would then communicate with a server 101 and signify that the character is about to "go mobile". The desktop's 102 screen may start an animation sequence (for example, an animation of the character leaving the screen). To coordinate, at the same time or nearly the same time, the application on the mobile device 103 may trigger an animation of the character entering the screen of the mobile device 103. The application on the mobile device 103 may also use other peripheral devices, such as the mobile device's microphone, accelerometer, GPS component, or any other sensing mechanism as a way to trigger sending a signal to the server 101 to have the character "join the user" on the mobile device 103. The server 101 in this regard can manage the virtual character, that is, keep track of which device currently hosts the virtual character.

A button, sequence, achieved goal, or other interaction online which "pushes" the character to a mobile device 103 may also be used. Once the character is "on" the mobile device 103, it can interact with the "real" world using the sensors, applications, and capabilities of the mobile device 103, such as camera, microphone, accelerometer, GPS, Near Field Communication, BLUETOOTH, WiFi, telephone, SMS, email, et cetera. The virtual character may use any input or output mechanisms on the device 103, and can even record and upload information to the server 101.

For example, while resident on the mobile device 103, if the camera is pointed at something the virtual character doesn't recognize (has no historical record of), the character can appear confused. If the camera is pointed at a recognizable object, such as grass captured in a picture displayed on mobile device 103 display, the virtual character can run around and play in the grass. If the camera is pointed at a certain box of cereal recognized by the virtual character, the virtual character may react accordingly by getting happy, eating some, gaining points or health, et cetera. If the camera is pointed at a game or other piece of merchandise or a store logo, the virtual character may perform a predetermined action or set of actions. For example, the virtual character may show the user how much fun it is to interact with what it sees, or give more information about the product (such as providing a hyperlink to a web page having product information).

Likewise, similar to a particular pet, such as a parrot, the virtual character may listen to the sounds around it and mimic what it hears, using mobile device's 103 speaker to play audio. For example, if the virtual character hears the sound of the ocean via a remote device's 103 microphone, the virtual character may start whistling a sailing tune. Such attributes may be utilized for sales and marketing purposes. For example, the virtual character could hear a particular music artist playing in the background (as sensed through a microphone of device 103) or otherwise detect the music artist (via accessing the device's play list) and make a comment about other similar artists as an advertisement for them. For example, the virtual character may open an Internet browser application and direct it to a shopping cart link for a relevant product.

While the virtual character is in an alternative environment, at any time, the virtual character may record any of this information gathered on the alternate device 103 and upload it into a scrapbook hosted by server 101. Thus, virtual character may utilize a device attribute, such as the availability of a camera or a microphone, to capture information (visual or audio in this example), and upload it to a server 101. Information transfer may be continuous or information can be saved locally to the mobile device 103 to be transferred batch style at some point in the future. The mechanism to transfer the state of the virtual character back to "online" 101 or "desktop" 102 may be triggered automatically or timed or goal based, or some combination of the foregoing. The mechanism for transfer may also be push (from the mobile device 103) or pull (from an online 101 or other location).

The virtual character may live (exist) in one or more virtual environments. An artist and/or a programmer create virtual environments either manually or algorithmically. This experience is known and widely used in virtual gaming worlds.

The virtual character may also live (exist) in real environments as experienced through a computer 102 or mobile device 103, for example via adapting to resident device capabilities, such as processing power, available input devices, et cetera. The virtual character may interact with anything that the particular device 102, 103 is able to "sense" (input data). Real environments include, but are not limited to, a user's front lawn/grass, a couch, and so on. The virtual character will "experience" and "interact" with such real environments using various sensors or inputs, for example such as gathered on a mobile device 103. Input devices include, but are not limited to a camera, a microphone, an accelerometer, a magnetometer, a GPS, Near Field Communication, BLUETOOTH, WiFi, telephone client, SMS client, email client, or any other input device. Because mobile devices 103 tend to have many of these types of input devices, they offer great potential for allowing ways for the virtual character to have fun and interact with the real world when the virtual character is on the mobile device 103.

Examples of sensor use in real environments include the following. The virtual character may use any input or output mechanisms on the device 102, 103. For example, if the virtual character is on a mobile device 103 with a camera, it can use the device's 103 camera as the input device. Thus, if the camera is pointed at mountain, the virtual character may be programmed to run up the mountain and plant a flag at the top, and/or perform other programmed actions. As another example, if the virtual character is on a device 103 with an accelerometer, a GPS, or any other mechanism for tracking location or movement, the virtual character can sense the movement of location and ask "Are we there yet?"

At any time, the device 103 can record the virtual character's activity history. This may be uploaded to a server 101 and saved for the life of the virtual character. The information may be uploaded into a scrapbook function, for example, which can be accessed from any other device in the future. Information transfer can be continuous to a remote device 101, or it can be saved locally to the mobile device 103 to be transferred batch style at some point in the future. When the virtual character (or user) is finished interacting with the real environment(s), the virtual character may be returned to its virtual environment 101, appropriately updated given its experiences while away from "home".

An example mechanism to transfer the state of the virtual character back to "online" 101 or "onto the desktop" 102 could be automatic or timed or goal based. The mechanism could also be push (from the device 103), or pull (from an online location 101).

The virtual character has two or more types of environments in which it can "live", interact with, and can be interacted with by the user. The first environment is the entirely virtual world. The user interacts with the virtual character in the virtual world with his or her computer browser, most often on a desktop or laptop computer 101. This virtual world can consist of any number of environments or environmental attributes. A second environment is the "real" world as it is experienced by the sensors of the computer or mobile device 103. This is technically augmented reality (as observed by the sensors), as embodiments are augmenting reality with the virtual character character. The varied sensors of various devices (on which the virtual character resides) are utilized for this virtual character.

The apparent mechanism by which the virtual character is transferred or "transported" from one environment (for example, the computer 102 or the mobile device 103) to the other can be made interesting and fun. For example, the transfer mechanism may involve visual simulation of the virtual character moving from one environment to the other. Thus, an embodiment may visually show (animate) the virtual character in various stages, such as fully in one environment, or a transitional state in which the virtual character exists partially in both environments momentarily.

The term "portable" is defined herein as meaning that software of the virtual character is likely to be running on multiple platforms (operating system/browser/et cetera). Also, "portable" indicates that the virtual character can be moved from one device/environment to another. Still further, "portable" indicates that one device is likely to be a mobile device, which is physically portable and can contain the virtual character, at least for a period of time.

The ability to transfer/transport the virtual character from one device to another may utilize a fun intuitive mechanism. The mechanism may involve augmented reality (described in connection with FIG. 2), or may involve a more manual transfer to a mobile device (described in connection with FIG. 3) or to a desktop device (described in connection with FIG. 4). The visual appearance of the virtual character moving from one device/screen to another adds to the realism of the virtual character. The basic technology to accomplish this includes having a device, such as server 101, be able to recognize the virtual character (the location in which a virtual character resides).

Figure 2:
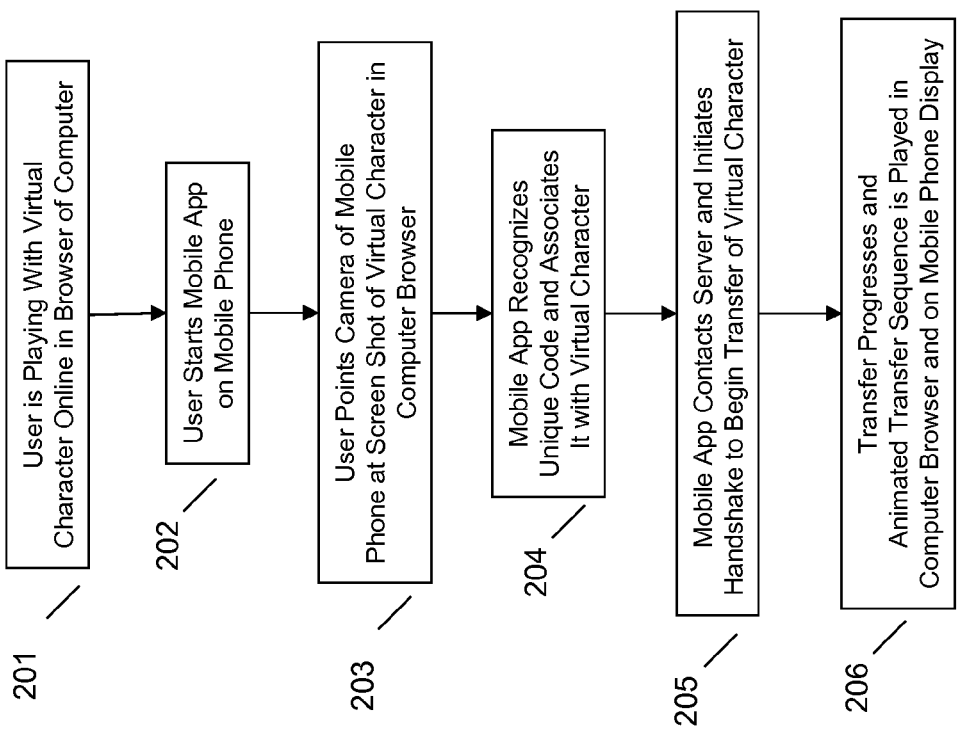
FIG. 2 illustrates an example method for transferring a portable virtual character from an online environment to a mobile device environment.

Referring to FIG. 2, a user may be playing with a virtual character online in a browser of a computer 201. A user may then start a mobile application (app) on the user's mobile phone 202. The user's mobile device may use augmented reality glyph/image recognition to understand that it is looking at a virtual location in which the virtual character can potentially live. For example, the user may point a camera of the mobile phone at the screen shot of the virtual character as represented in the browser 203. A logo or any unique image on the screen may be used as the glyph for recognition 204. The mobile application may then contact the server and initiate a handshake (or other transfer mechanism) to begin transfer of the virtual character 205. Both devices involved (computer and mobile phone) in the transfer need a mechanism for communication to each other, for example a two-way handshake to ensure that the character doesn't accidentally get transferred into a device that has become unavailable. Once the mobile device has recognized the glyph, it can initiate the handshake. When the handshake is complete, the transfer can be initiated either automatically or manually by the user and include an animated sequence 206. Automatic choices may include event based or other algorithmically determined options. Manual options may present the user with the option to transfer the character from one device to the other based on a variety of factors.

Figure 3:
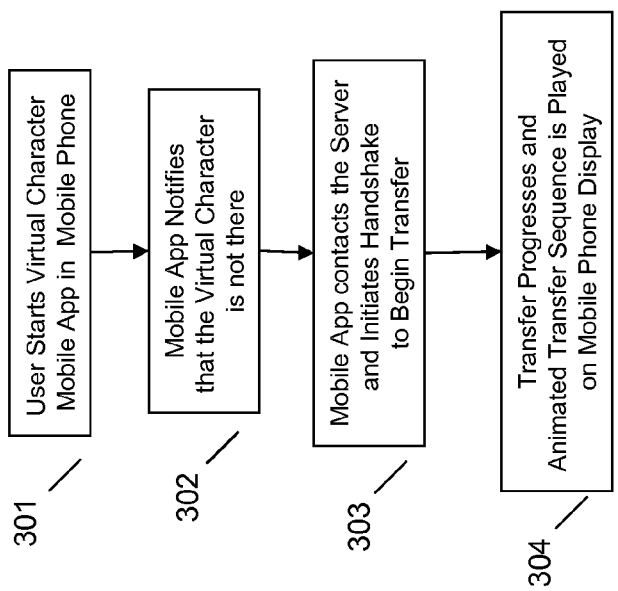
FIG. 3 illustrates an example method for transferring a portable virtual character into a mobile device environment.

Referring to FIG. 3, to manually transfer a virtual character to a mobile device (when the user has not yet transferred the character to the mobile device), a user may start a virtual character application on his or her mobile phone 301. The mobile application will notify the user that the virtual character is not there, but if the user calls the virtual character, the virtual character will come 302. The mobile application then contacts the server and initiates a handshake (or other transfer mechanism) to begin the transfer of the virtual character 303. The transfer then progresses, with the mobile application playing an animated sequence showing the virtual character entering the mobile phone 304.

Figure 4:
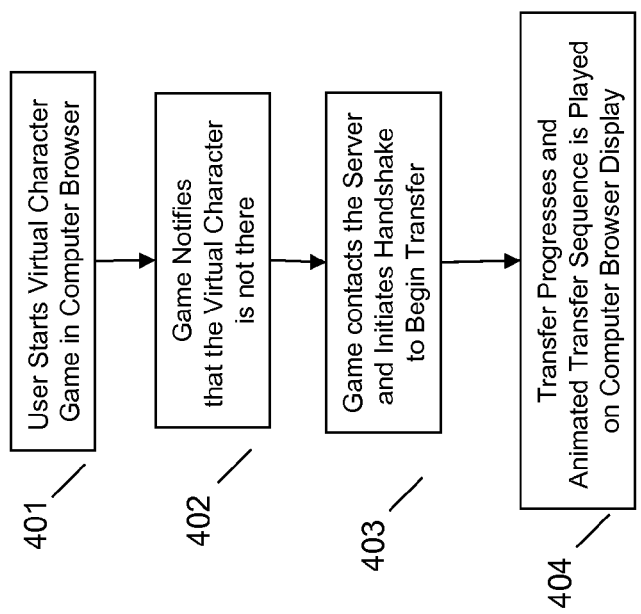
FIG. 4 illustrates an example method for transferring a portable virtual character into a computer browser environment.

Similarly in FIG. 4, a user may transfer a virtual character to a desktop device (for example, in a computer browser), for example if the character is currently residing on a mobile phone. If a user starts a virtual character game on the desktop 401, the game will initially notify the user that the character is not there 402. The game application in the computer then contacts the server to initiate a handshake (or other transfer mechanism) to begin the transfer of the virtual character 403. The transfer process then begins and an animated sequence is played in the computer browser showing the virtual character entering the browser 404.

The state of the virtual character, including the device the virtual character is currently on, may be maintained in both devices temporarily, but may also be maintained more authoritatively in a central server 101. Alternatively, there could be no handshake mechanism. The transfer process could be initiated as a manual push (from the server 101 perspective, from the device 103 it appears more as a pull) from one device to the other. As this is potentially less interesting for the user, this option may be useful for the event in which the virtual character has been transferred to a device which the user can no longer access. The user could be presented with something like a whistle or a bell that they can use to "call" their virtual character from another device. For devices expected to have microphones, a user could literally whistle, clap, or call their virtual character's name for this retrieval purpose. Regardless of the mechanism, a fun animation may exist to represent the virtual character leaving and/or entering the devices. The devices may thus each have complimentary animations (for example, leaving the desktop and entering the mobile device).

In terms of managing virtual character data or information, there may be a primary database for maintaining the attributes and state of the virtual character to which all other databases could synchronize. Other mini-databases or copies may be utilized for other environments on any device that is intermittently or rarely connected to the server 101. Such sub-databases may be as simple as attributes or variables maintained in RAM. The databases may synchronize back up with other data stores upon regaining connectivity. In particular, a database or data table listing device attributes (attributes of a user's devices) may be utilized such that variations of the virtual character (virtual character having different attributes) may be sent to appropriate devices.

Figure 5:
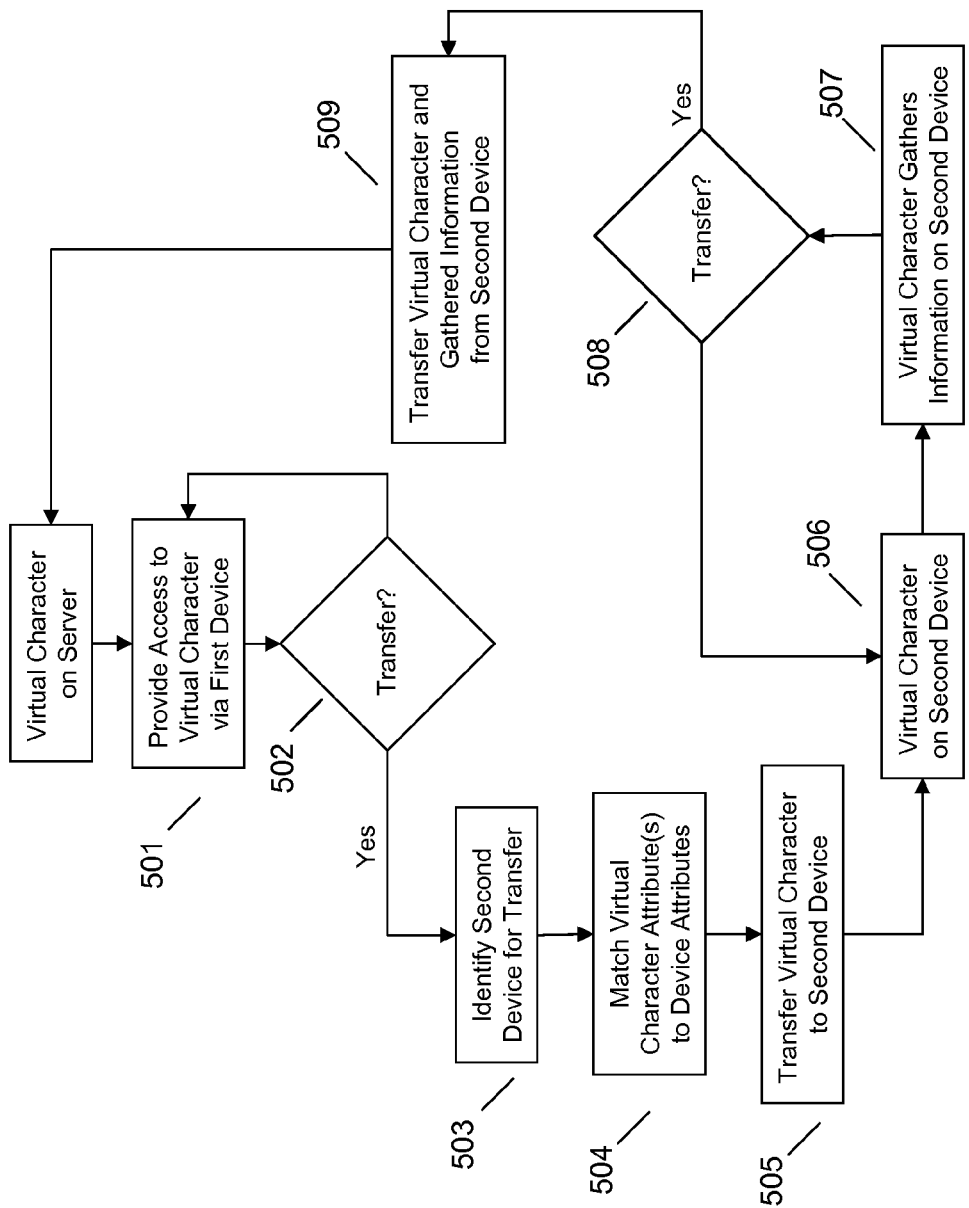
FIG. 5 illustrates an example method of transfer and use of a portable virtual character in different environments.

As a specific example, referring to FIG. 5, an embodiment provides a virtual character on a server. The virtual character on the server may be provided 501 on a first device, such as a user's desktop computer. The virtual character on the server has a plurality of attributes allowing for a plurality of versions of the virtual character, such as a version to be provided on a desktop computer, a version to be provided on a mobile phone, et cetera. The server may maintain a database, such as a device table, listing devices available for transfer and their attributes. For example, the server may maintain a list of the user's devices, for example a desktop computer, a mobile phone, et cetera, as well as attributes of those devices (processing capabilities, peripheral devices available, et cetera). Responsive to a transfer signal 502, such as a manual request or an automatically triggered transfer request, the virtual character may be transferred to a second device. This may involve for example identifying the second device to which the virtual character is to be transferred 503, and matching a version of the virtual character to the device's attribute(s) 504. Thus, relevant information to permit an instantiation of the virtual character on the second device is transferred to the second device 505. The instantiation of the virtual character on the second device includes at least one attribute matching an attribute of the second device as determined from the device table. Thus, a virtual character version capable of utilizing a camera on a mobile phone is sent to a mobile phone having a camera, et cetera.

While resident on the second device 506, the virtual character may play in the new environment. As part of this interaction with a user, the virtual character may gather information 507 using device attributes, such as a determined location of the second device as sensed through GPS input, a particular object recognized via a camera input, or an audio input recognized via a microphone input, et cetera. Thus, the received virtual character information from the second device may be related to the at least one attribute of the second device, and permits updating of the virtual character on the first device. At any point in time, such as for example after a transfer request 508, the virtual character and/or gathered virtual character information may be transferred back to another device 509, such as back to the server.

Illustrated in FIG. 6(A-F) are examples of virtual character portability. Corresponding to the general steps outlined in connection with FIG. 5, a virtual character (in this non-limiting example, the virtual "pet" is in the form of a human like animated character named ACES) may initially reside on a desktop device, FIG. 6A. The user may then utilize an augmented reality sequence (similar to that described in connection with FIG. 2) to initiate a transfer signal, such as by capturing an image of the virtual character with a second, mobile device, FIG. 6B.

Figure 6A:
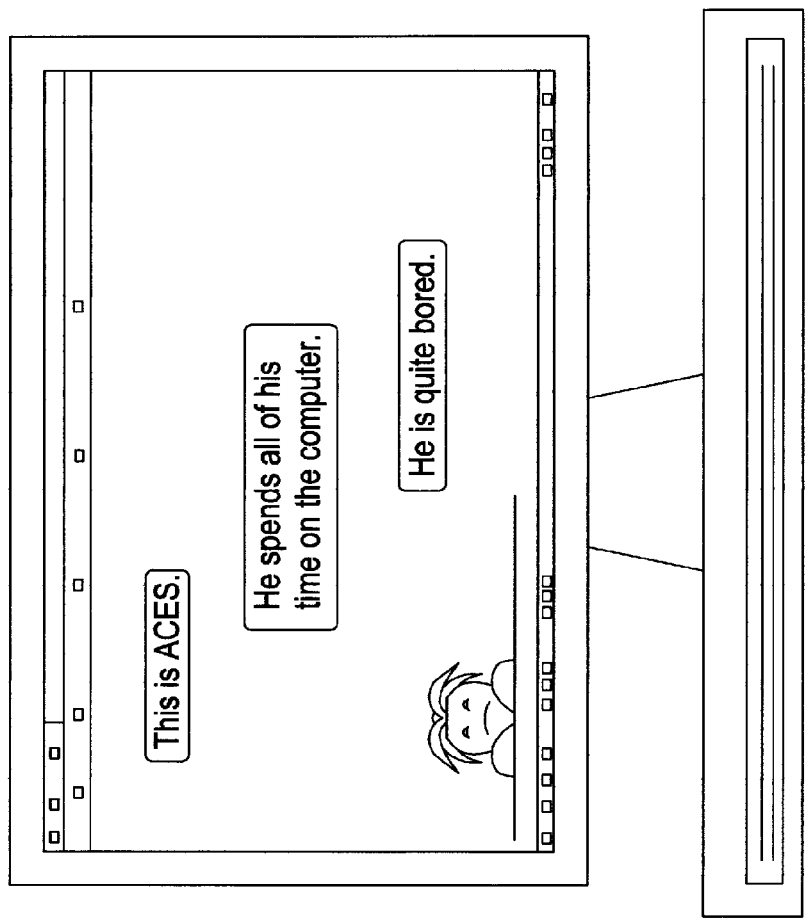
FIG. 6 (A-F) illustrates examples of transfer and use of a portable virtual character in different environments.
Figure 6B:
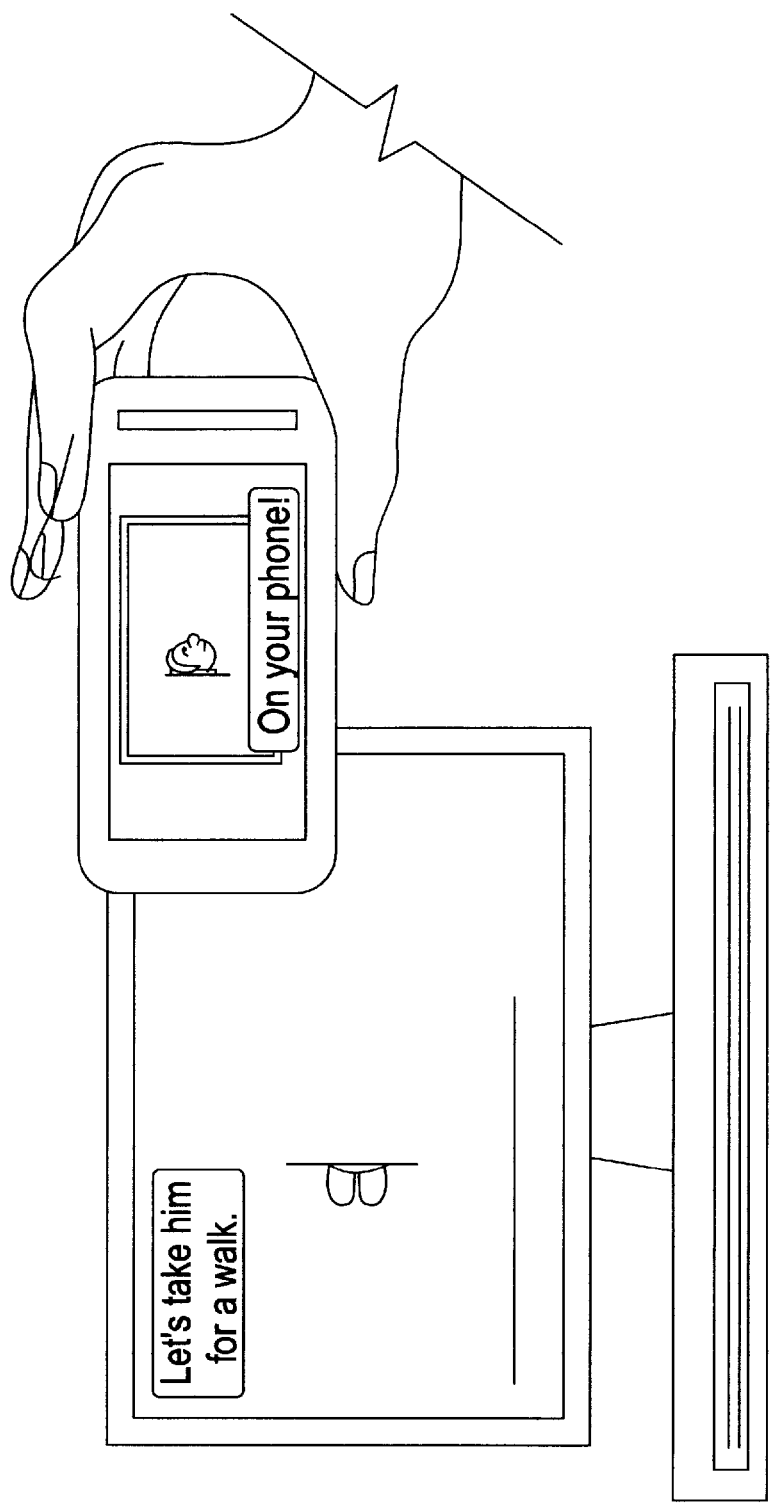
Figure 6C:
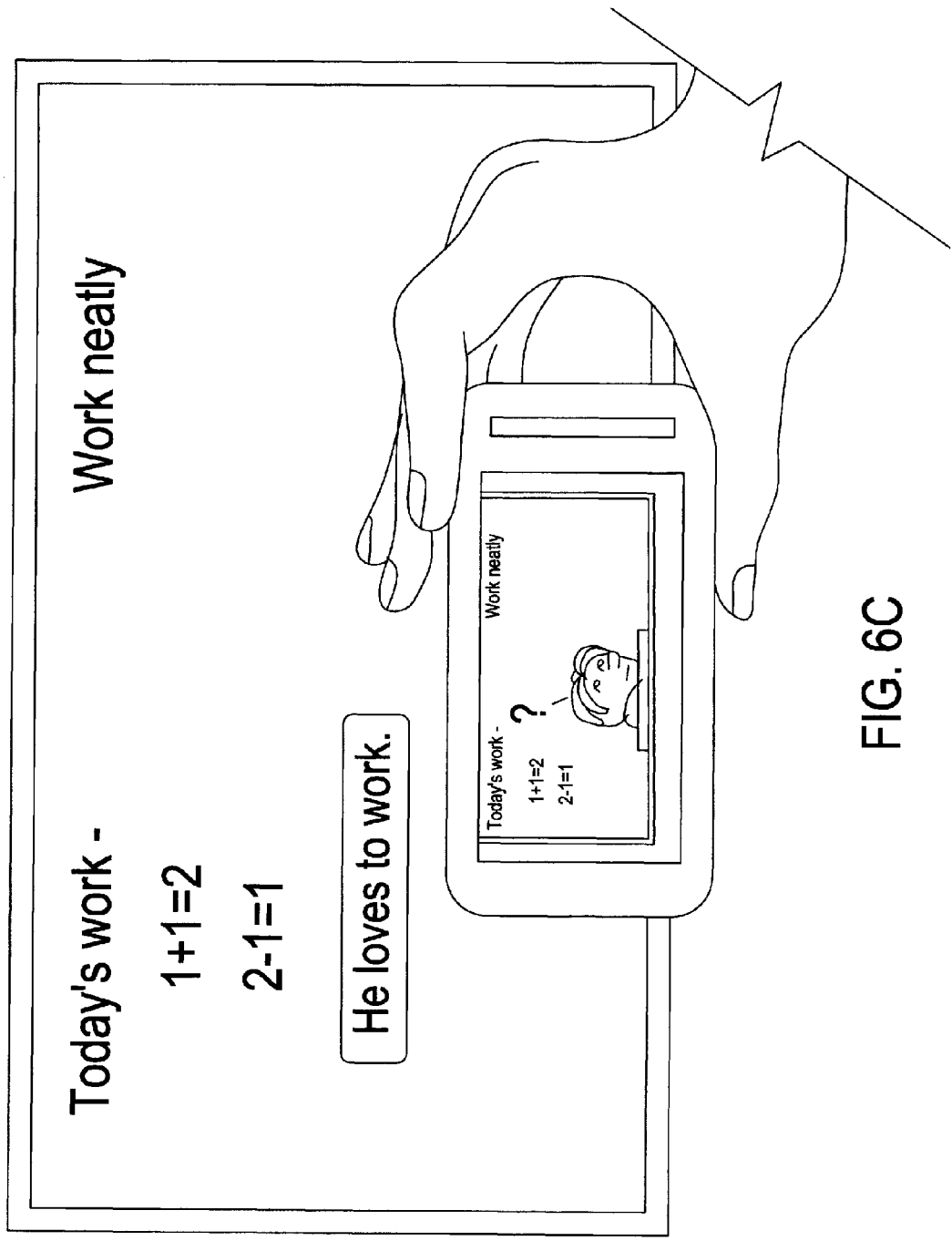
Figure 6D:
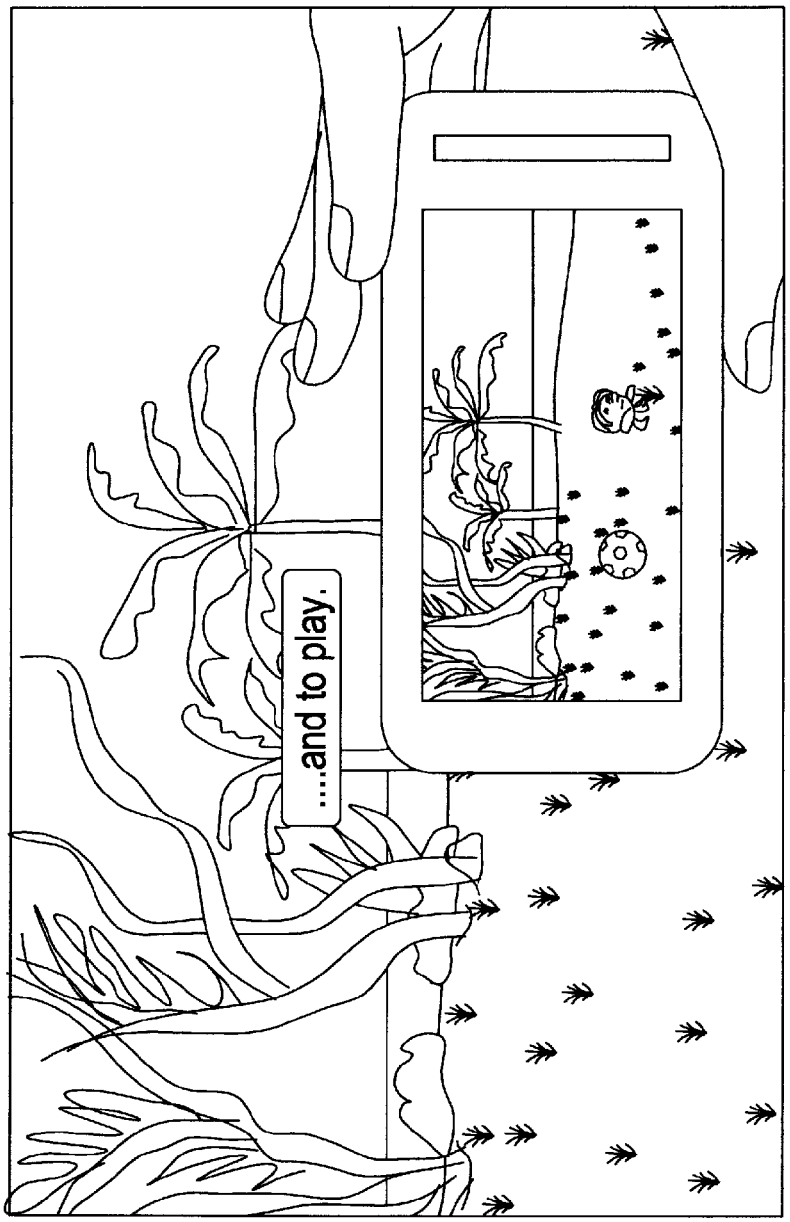

Once resident on the mobile device, the transferred virtual character may adapt to the new environment, for example using a picture taken with mobile device of a work room to mimic working as part of the picture and presenting an appropriate textual communication, FIG. 6C. For example, if FIG. 6C the virtual character is illustrated as occupying a picture of the actual working environment displayed on a mobile device screen. Thus, the virtual character may work in the same environment as the mobile device user. Similarly, if the mobile device is taken outside to capture a picture, the virtual character may mimic a play scene using the picture captured outside, FIG. 6D. For example, virtual character and a soccer ball are illustrated in an animation that includes an image as background, with the background image being provided by the camera of the mobile device.

Figure 6E:
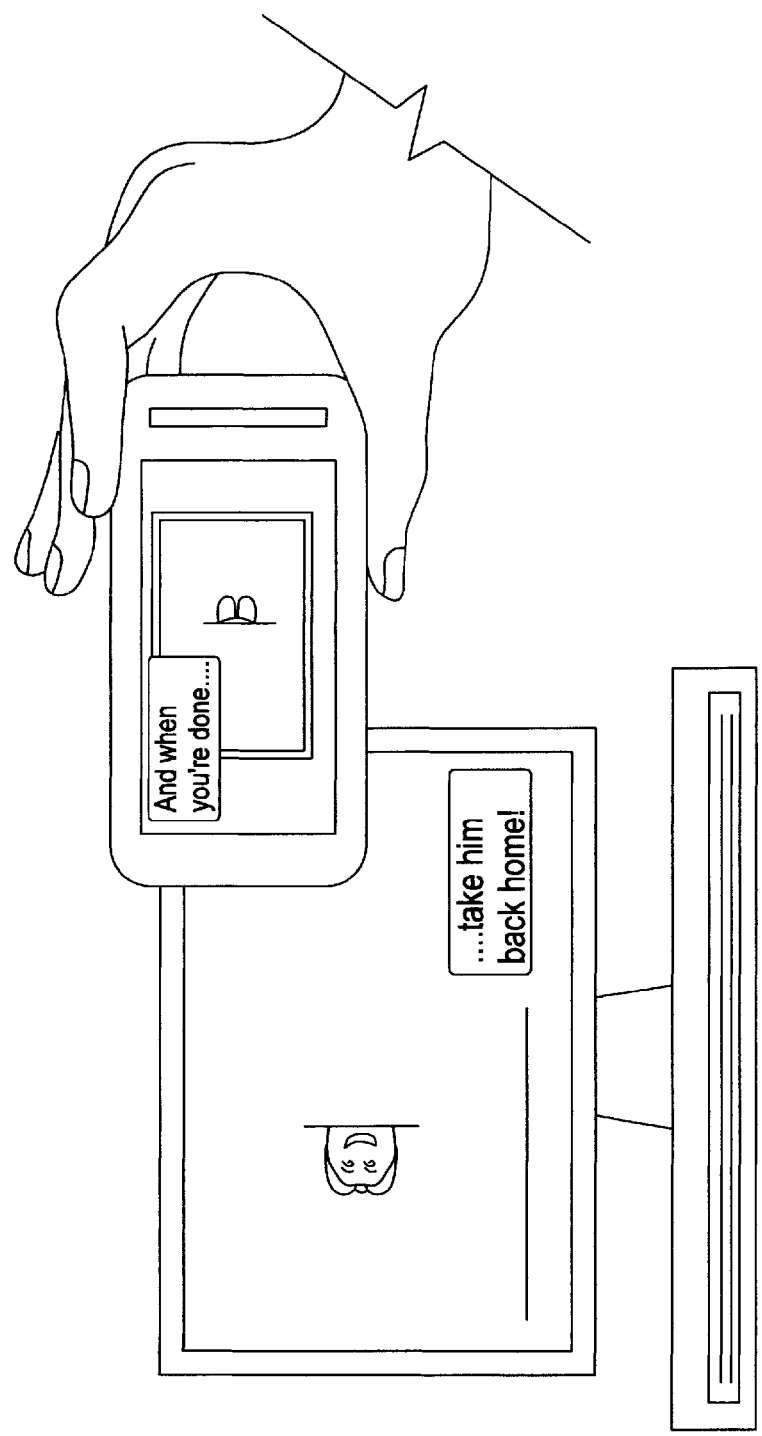
Figure 6F:
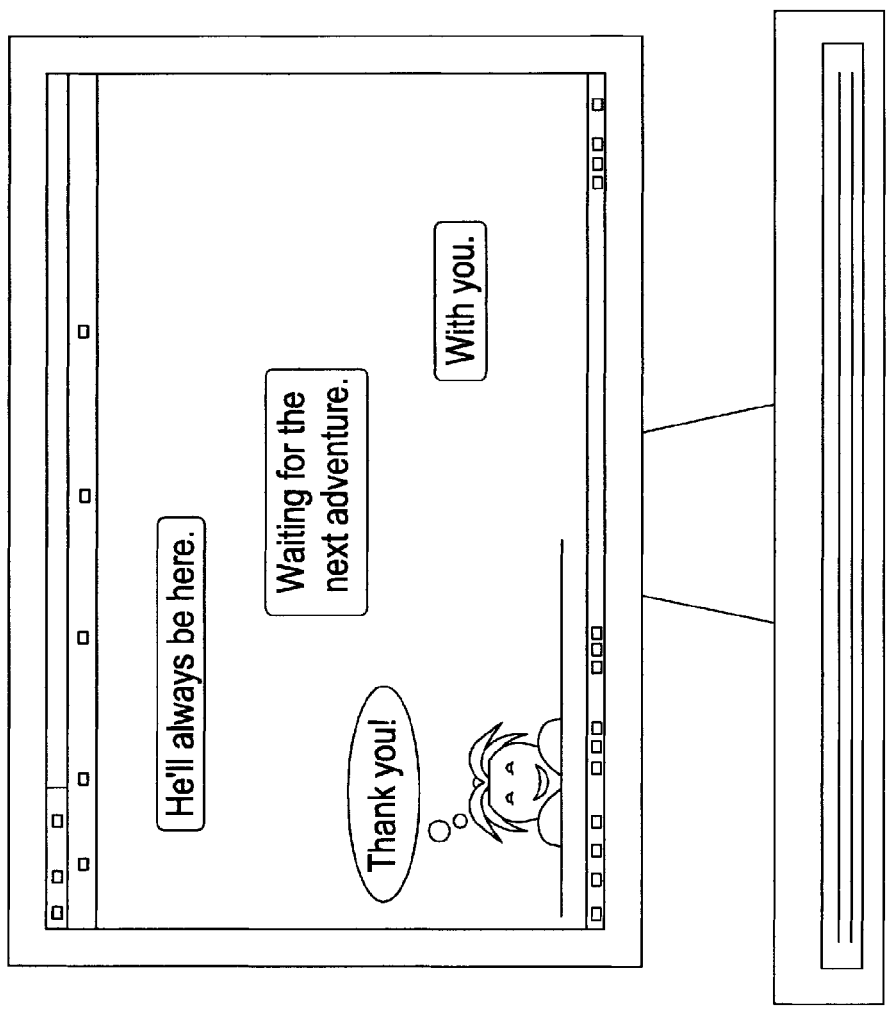

When appropriate, the user may initiate transfer of the virtual character back to the desktop device, for example by using another augmented reality transfer sequence similarly to the one used to initially transfer the virtual character, FIG. 6E. Once the virtual character is back on the "home" device, it may update its records to record the visit to another device, as well as play an animated sequence thanking the user, FIG. 6F.

It should be noted that during the "transfers", the virtual character is transferred from device to device. However, the amount and nature of information required for transfer may vary, depending on the circumstance. For example, if a user downloads a mobile application having a version of the virtual character designed specifically for that mobile phone, only a simple transfer signal may be necessary. Alternatively, more information may need to be transferred if the user has not already installed any virtual character information.

Augmented reality based on utilization of peripheral devices, such as image recognition, may be based on a combination of existing tools. For example, image based augmented reality may be based on the Qualcomm Augmented Reality SD (QCAR SDK) and the Unity 3D game development tool, with Django for the state machine (server) in the back end. It will be readily understood by those having ordinary skill in the art that a variety of information handling devices may be employed in implementing various embodiments.

Figure 7:
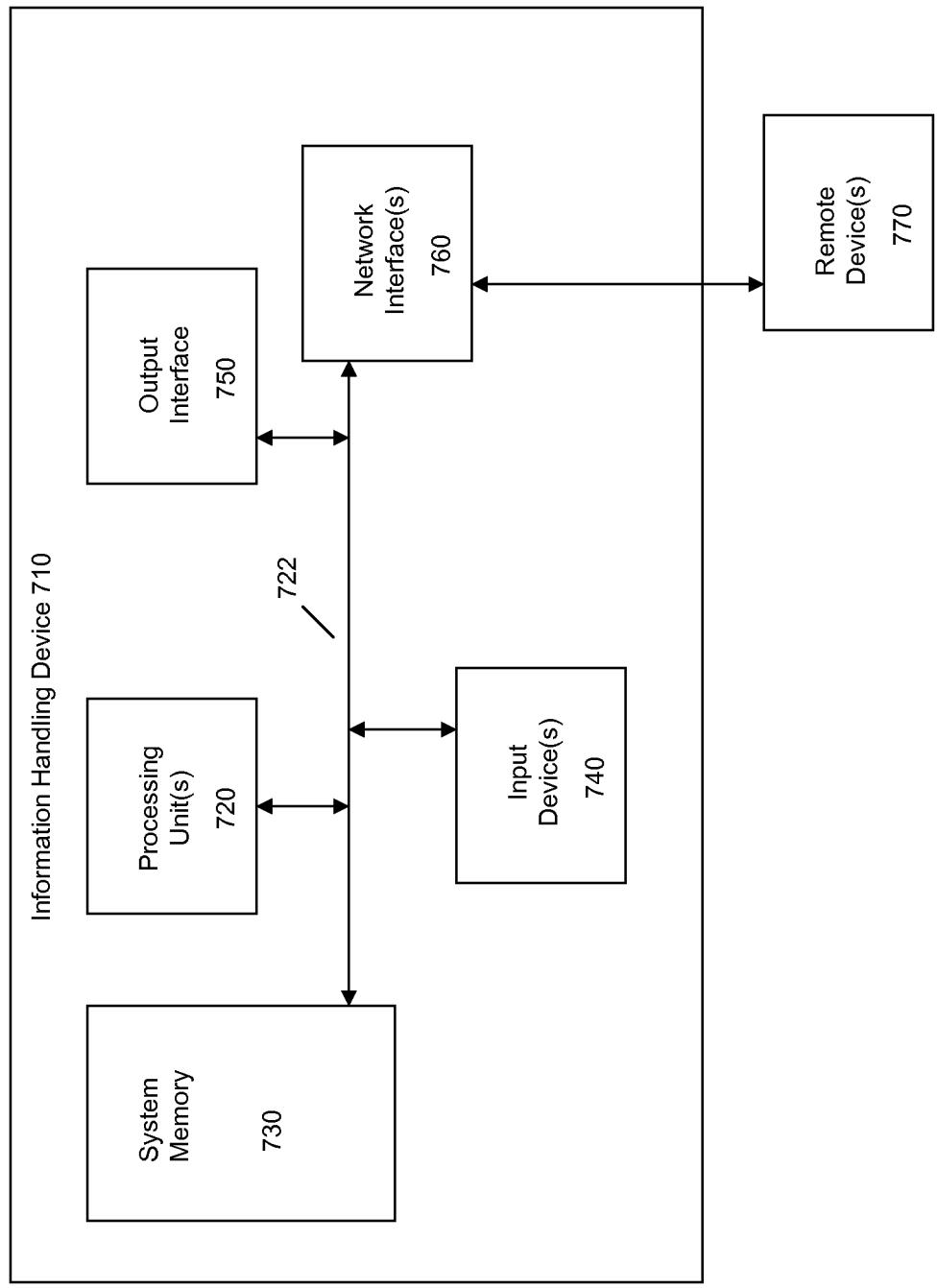
FIG. 7 illustrates an example information handling device.

Referring to FIG. 7, an example device that may be used in implementing embodiments includes information handling device 710 in the form of a computer or a mobile phone. In this regard, the information handling device 710 may execute program instructions configured to provide portable virtual characters, and perform other functionality of the embodiments, as described herein.

Components of information handling device 710 may include, but are not limited to, at least one processing unit 720, a system memory 730, and a system bus 722 that couples various system components including the system memory 730 to the processing unit(s) 720. The information handling device 710 may include or have access to a variety of computer readable media. The system memory 730 may include computer readable storage media in the form of volatile and/or nonvolatile memory such as read only memory (ROM) and/or random access memory (RAM). By way of example, and not limitation, system memory 730 may also include an operating system, application programs, other program modules, and program data.

A user can interface with (for example, enter commands and information) the information handling device 710 through input devices 740. A monitor or other type of device can also be connected to the system bus 722 via an interface, such as an output interface 750. In addition to a monitor, information handling devices may also include other peripheral output devices. The information handling device 710 may operate in a networked or distributed environment using logical connections (network interface 760) to other remote computers or databases (remote device(s) 770). The logical connections may include a network, such local area network (LAN) or a wide area network (WAN), a cellular network, but may also include other networks.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in computer readable medium(s) having computer readable program code embodied therewith.

Any combination of computer readable medium(s) may be utilized. The computer readable medium may be a non-signal computer readable medium, referred to herein as a computer readable storage medium or device. A computer readable storage medium or device is non-transitory and may include, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any programming language or combinations thereof, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects have been described herein with reference to illustrations of methods, apparatuses, systems and computer program products according to example embodiments. It will be understood that some or all of the functionality in the illustrations may be implemented by computer program instructions. These computer program instructions may be provided to a processor of a computer or other programmable data processing apparatus (information handling device) to produce a machine, such that the instructions, which execute via the processor of the computer or other programmable data processing apparatus, create means for implementing the functions/acts specified in the illustrations.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions/acts specified in the illustrations.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer, or other programmable apparatus, provide processes for implementing the functions/acts specified in the illustrations.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method for providing a virtual character, comprising:
   storing, in device memory, a listing of at least one mobile device having at least one device component selected from the group consisting of an accelerometer, a camera, and a microphone; and
   transferring, using a processor, to a mobile device information to permit an instantiation of a mobile device version of a virtual character on the mobile device, the instantiation of the virtual character on the mobile device including at least one virtual character attribute matching the at least one device component selected from the group consisting of an accelerometer, a camera, and a microphone.

2. The method of claim 1, further comprising:
   receiving virtual character information from the at least one mobile device, wherein the virtual character information is related to the at least one virtual character attribute.

3. The method of claim 1, wherein the virtual character adapts to the mobile device by employing the at least one virtual character attribute.

4. The method of claim 3, wherein the at least one virtual character attribute is implemented via utilizing the at least one device component.

5. The method of claim 1, wherein the at least one virtual character attribute is sight and is implemented using the camera.

6. The method of claim 1, further comprising recognizing an identifier prior to transferring the virtual character to the mobile device.

7. The method of claim 6, wherein the identifier includes one or more of: a sound, location information, an image, and a code.

8. The method of claim 7, wherein the recognizing an identifier comprises receiving data from the mobile device.

9. The method of claim 6, further comprising providing an animated sequence during transfer to the mobile device.

10. The method of claim 1, further comprising receiving update information associated with the virtual character residing on the mobile device.

11. The method of claim 10, wherein said update information associated with the virtual character residing on the mobile device is gathered utilizing the at least one device component.

12. A device, comprising:
    a network communication element;
    a memory; and
    one or more processors operatively coupled to the memory and the network communication element,
    the one or more processors executing instructions stored in the memory to:
    store in a device memory a listing of at least one mobile device having at least one device component selected from the group consisting of an accelerometer, a camera, and a microphone; and
    transfer to a mobile device information to permit an instantiation of a mobile device version of a virtual character on the mobile device, the instantiation of the virtual character on the mobile device including at least one virtual character attribute matching the at least one device component selected from the group consisting of an accelerometer, a camera, and a microphone.

13. The device of claim 12, wherein the one or more processors further execute instructions to:
    receive virtual character information from the at least one mobile device, wherein the virtual character information is related to the at least one virtual character attribute.

14. The device of claim 12, wherein the virtual character adapts to the mobile device by employing the at least one virtual character attribute.

15. The device of claim 14, wherein the at least one virtual character attribute is implemented via utilizing the at least one device component.

16. The device of claim 12, wherein the at least one virtual character attribute is sight and is implemented using the camera.

17. The device of claim 12, wherein the one or more processors further execute instructions to recognize an identifier prior to transferring the virtual character to the mobile device.

18. The device of claim 17, wherein the identifier includes one or more of: a sound, location information, an image, and a code.

19. The device of claim 18, wherein recognizing an identifier comprises receiving data from the mobile device.

20. A computer program product for providing a virtual character, comprising:
    a computer readable storage device having computer readable program code embodied therewith, the computer readable program code being executable by a processor and comprising:
    code that stores in a device memory a listing of at least one mobile device having at least one device component selected from the group consisting of an accelerometer, a camera, and a microphone; and
    code that transfers to a mobile device information to permit an instantiation of a mobile device version of a virtual character on the mobile device, the instantiation of the virtual character on the mobile device including at least one virtual character attribute matching the at least one device component selected from the group consisting of an accelerometer, a camera, and a microphone.

* * * * *